(12) United States Patent
Lin

(10) Patent No.: US 7,453,268 B2
(45) Date of Patent: Nov. 18, 2008

(54) INPUT POWER PROTECTED RATIOMETRIC OUTPUT SENSOR CIRCUIT

(75) Inventor: Yingjie Lin, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 233 days.

(21) Appl. No.: 11/472,802

(22) Filed: Jun. 22, 2006

(65) Prior Publication Data

US 2007/0001255 A1  Jan. 4, 2007

Related U.S. Application Data

(60) Provisional application No. 60/694,833, filed on Jun. 29, 2005.

(51) Int. Cl.
*G01R 25/06* (2006.01)
*G01R 27/02* (2006.01)
*H02H 3/20* (2006.01)

(52) U.S. Cl. .................. 324/608; 324/609; 361/91.5

(58) Field of Classification Search ............ 324/608, 324/609; 361/91.5
See application file for complete search history.

(56) References Cited

U.S. PATENT DOCUMENTS 4,423,456 A * 12/1983 Zaidenweber ............ 361/77

* cited by examiner

*Primary Examiner*—Diego Gutierrez
*Assistant Examiner*—Amy He
(74) *Attorney, Agent, or Firm*—Paul L. Marshall

(57) ABSTRACT

MOSFETs are provided to connect the sensor input terminals of a ratiometric output sensor to a pair of power terminals, and the gate of each MOSFET is coupled to the opposite power terminal so that both MOSFETs are rendered conducting to power the sensor when a supply voltage of a predetermined polarity is connected across the power terminals but one of the MOSFETs is rendered non-conducting when a voltage of the opposite polarity is so applied. The MOSFET that is rendered non-conducting is oriented so that any internal source-drain diode does not bypass current around the MOSFET when voltage of the opposite polarity is applied. Optionally, overvoltage protection is provided by an input voltage sensor controlling the other MOSFET through a third MOSFET.

7 Claims, 1 Drawing Sheet

INPUT POWER PROTECTED RATIOMETRIC OUTPUT SENSOR CIRCUIT

This application claims the benefit of U.S. Provisional Application No. 60/694,833, filed Jun. 29, 2005.

TECHNICAL FIELD

The technical field of this invention is input power protection for ratiometric output sensors.

BACKGROUND OF THE INVENTION

A ratiometric output sensor is used to measure various physical parameters, such as pressure, strain or position. It is usually powered by a regulated DC supply; and its output is typically a voltage. The output voltage is not only a function of the environmental parameter that is measured; it is also a function of the DC supply (input) voltage in a predefined range. For this kind of sensor, it is the ratio of the sensor output voltage to the supply voltage, rather than the sensor output voltage itself, that indicates the value of the parameter measured by the sensor. The sensor is commonly located remotely from the control module and is powered thereby.

Ratiometric output sensors are typically powered by low voltage (e.g. 5 volts) regulated DC power supplies; and reverse voltage protection and over-voltage protection are typically provided by the DC power supply and/or the controller module in which the ratiometric sensor is used. But there is also a need for a self-protected ratiometric output sensor, particularly for mobile and/or battery operated applications. Reverse voltage protection is generally provided in electronic circuits by a series blocking diode, which permits current flow when the battery or other DC voltage supply is connected with a predetermined polarity but blocks current flow in the opposite direction when the polarity of the power supply connection is reversed from the predetermined polarity. But the typical blocking diode introduces a significant forward voltage drop in series with the sensor during sensor operation that is inconsistent with ratiometric output. Thus, there is a need for a power protected ratiometric output sensor circuit that provides reverse supply voltage protection without using a series diode in sensor operation and optionally provides over-voltage protection with minimal added part count and cost.

SUMMARY OF THE INVENTION

The input power protected ratiometric output sensor circuit of this invention provides reverse supply voltage protection and, optionally, over-voltage protection for a ratiometric output sensor without negatively affecting its ratiometric output and at a minimal added cost.

For reverse power protection, the circuit of this invention includes a p-channel MOSFET with a source and a drain connected in series between a first power terminal and a first sensor input terminal of a ratiometric output sensor and further having a gate coupled to a second power terminal. The circuit of this invention also includes an n-channel MOSFET with a source and a drain connected in series between the second power terminal and a second sensor input terminal of the ratiometric output sensor and further having a gate coupled to the first power terminal. Connection of a DC voltage power supply across the first and second power terminals with a predetermined positive polarity of the first power terminal relative to the second power terminal renders both the p-channel MOSFET and the n-channel MOSFET conducting to power the ratiometric output sensor; but connection of a DC voltage power supply across the first and second power terminals with a polarity reversed relative to the predetermined polarity renders one of the p-channel MOSFET and the n-channel MOSFET non-conducting. The one of the p-channel MOSFET and the n-channel MOSFET has its source and drain oriented with respect to the load impedance so that any internal source-drain bypass diode therein is not effective to conduct bypass current flow with connection of a DC voltage power supply with a polarity reversed relative to the predetermined polarity across the first and second power terminals. And since the low conducting resistance $R_{ON}$ of the p-channel MOSFET or the n-channel MOSFET provides a voltage drop in the conducting state smaller than the forward voltage drop of any internal source-drain bypass diode therein, the source-drain bypass diode does not conduct when its MOSFET is rendered conducting; and there is thus no forward diode drop in series with the powered ratiometric output sensor.

For additional over-voltage protection, the circuit of this invention adds a third MOSFET having a source and a drain connected between the gate and source of the other of the p-channel MOSFET and the n-channel MOSFET and a voltage sensing circuit having an output connected to a gate of the third MOSFET. The voltage sensing circuit is thus responsive to the voltage across the first and second power terminals to control the third MOSFET in switching mode to render the other of the p-channel MOSFET and the n-channel MOSFET non-conducting when the voltage applied across the first and second power terminals with the predetermined polarity is greater than the predetermined value. Further details and advantages of the invention will be apparent from the following description of preferred embodiments.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
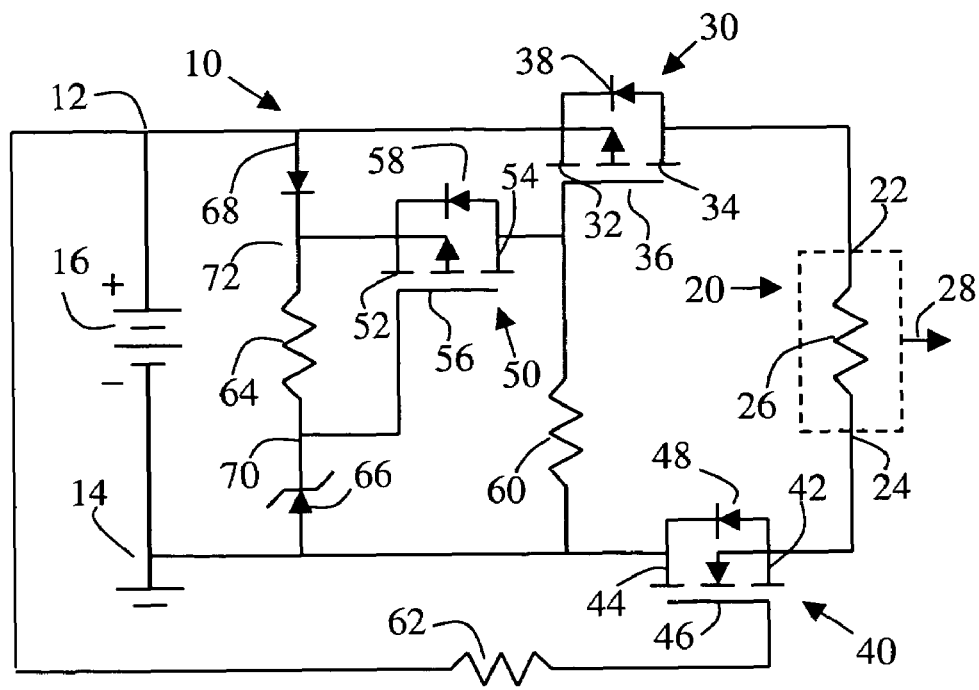
FIG. 1 is a circuit diagram of a first embodiment of the invention.

Referring to FIG. 1, a power protected ratiometric output sensor circuit 10 has power terminals 12 and 14, with terminal 14 designated circuit ground. A DC power supply 16 has positive and negative terminals as marked in the drawing, with the positive supply terminal connected to power terminal 12 of circuit 10 and the negative supply terminal connected to terminal 14 of circuit 10. The DC power supply 10 may be a battery or any other electrical power supply providing current at a nominal output voltage. Circuit 10 is designed to operate with the DC power polarity applied as shown, with terminal 12 positive with respect to terminal 14; and this will be referred to as predetermined power polarity. But DC power supplies, especially batteries, are capable of being connected with reversed polarity, in which terminal 12 is negative with respect to terminal 14; and such a reversal will be referred to as reversed battery polarity. Reversed battery polarity is undesirable in a DC powered resistive sensor circuit; and this is one of the conditions for which circuit 10 provides protection.

A ratiometric output sensor 20 has an internal load impedance 26 between two sensor input terminals 22 and 24 and a ratiometric output terminal 28. Load impedance 26 is the total effective resistance between sensor input terminals 22 and 24. At least one impedance comprising load impedance 26 varies with an external parameter, such as temperature, pressure, strain, position, etc. to produce a change in the output voltage on output terminal 28 that varies with the external parameter. As a ratiometric voltage, this output voltage will also vary proportionately with the voltage provided across sensor input terminals 22 and 24 by DC power supply 16; and thus both the output voltage on terminal 28 and the DC voltage at power terminal 12 would be provided to the processor receiving the output of sensor 20 to obtain an accurate reading of the sensed parameter. The design of ratiometric output sensors and the processing of the output of sensor 20 are well known in the art and are not in themselves the subject matter of this invention; so neither will not be further described except where necessary to understand the operation of circuit 10.

Circuit 10 includes a p-channel MOSFET 30 with a source 32 and drain 34 connected in series between power terminal 12 (and thus the positive terminal of DC power supply 16) and terminal 22 of sensor 20 (and thus of load impedance 26). MOSFET 30 further has a gate 36 for controlling its conduction status. As with most MOSFETs, MOSFET 30 includes an internal protective source-drain bypass diode 38; and source 32 of MOSFET 30 (and thus the cathode of the diode in this p-channel MOSFET) is connected to the more positive power terminal 12 so that the diode is oriented in the circuit to oppose bypass current flow from sensor 20 to DC power supply 16.

Circuit 10 also includes an n-channel MOSFET 40 with a source 42 and drain 44 connected in series between terminal 24 of sensor 20 (and thus of load impedance 26) and power terminal 14 (and thus of the negative terminal of DC power supply 16). MOSFET 40 further has a gate 46 controlling its conduction status. Source 42 of MOSFET 40 (and thus the anode of the internal protective bypass diode 48 of this n-channel MOSFET) is connected to terminal 24 of sensor 20. Thus, bypass diode 48 of MOSFET 40 is oriented in the circuit to be forward biased with the normal DC voltage polarity applied to the circuit. But MOSFET 40 (as well as MOSFET 30) has a very low conducting resistance $R_{ON}$ compared to the load impedance 26. This low conducting resistance provides a drain-source voltage that is smaller than the forward voltage drop of diode 48 and thus shorts out the diode. Thus, the forward voltage drop of diode 48 will not appear in series with the voltage across load impedance 26 during conduction of n-channel MOSFET 40 with normal supply voltage polarity.

The gate of p-channel MOSFET 30 is electrically coupled to power terminal 14 by connection through a resistor 60, and a negative gate source voltage is thus provided to MOSFET 30 with normal battery polarity to render MOSFET 30 it conducting. Likewise, the gate of n-channel MOSFET 40 is coupled to power terminal 12 by connection through a resistor 62, and a positive gate-source voltage is provided to MOSFET 40 with normal battery voltage to render MOSFET 40 conducting. When both MOSFET 30 and MOSFET 40 are thus rendered conducting, the sensor is powered to produce an output signal on terminal 28. Since diode 38 of p-channel MOSFET 30 is reverse biased and diode 48 of n-channel MOSFET 40 is shorted out, neither of diodes 38 and 48 will adversely affect the ratiometric output of sensor 20 powered with normal supply voltage polarity. This is the normal operating state of the circuit.

With reverse battery polarity, MOSFET 40 will be turned off by a reversed (negative) gate-source voltage. With MOSFET 40 not conducting and its bypass diode 48 oriented to block current flow in the reversed polarity direction (from power terminal 14 to sensor 20), no current will flow through MOSFET 40, or through sensor 20, in either direction. Thus, the circuit blocks conduction through load impedance 26 when the DC power supply polarity is reversed.

Circuit 10 also provides over-voltage protection, through a voltage sensing circuit and a switch. The switch is a third MOSFET 50, in this embodiment a p-channel MOSFET, that has a source 52 connected to the source of MOSFET 30 and a drain 56 connected to gate 36 of MOSFET 30. A resistor 64 is connected from the gate 56 to the source 52 of MOSFET 50. The voltage sensing element is a zener diode 66 connected from the gate 56 of MOSFET 30 to power terminal 14. Resistor 64 and zener diode 66 form a voltage divider coupled across power terminals 12, 14 and further have a junction 70 connected to gate 56 of MOSFET 50. The circuit may optionally include a blocking diode 68 connected in series between resistor 64 and power terminal 12, for reasons explained in the following paragraph. A gate-source voltage of about two volts is required to render MOSFET 50 conductive, so there is no current through zener diode 66 until the supplied voltage equals the zener breakdown voltage plus 2 volts (plus the forward diode drop of diode 68 if present). When the battery voltage exceeds this sum, MOSFET 50 will be rendered conductive; and it will short the gate and source of MOSFET 30 to render the latter non-conducting. The zener breakdown voltage of diode 66 is chosen to be two volts (or two volts plus the forward diode drop of diode 68 if present) less than a predetermined maximum voltage at which it is desired to stop conduction through sensor 20; and protective circuit 10 thus protects against over-voltage.

Blocking diode 68 may optionally be inserted as shown between power terminal 12 and the junction 72 of resistor 64 and drain 52 of MOSFET 50. Without diode 68, the over-voltage protection portion of circuit 10 provides two current paths for a reverse polarity supplied voltage. The first is through zener diode 66 and resistor 64, and a second, parallel path is through resistor 60 and MOSFET 50. Diode 68 blocks both paths. But if resistors 60 and 64 are both sufficiently large, or if the over-voltage protection portion of circuit is not present, diode 68 is not necessary.

Figure 2:
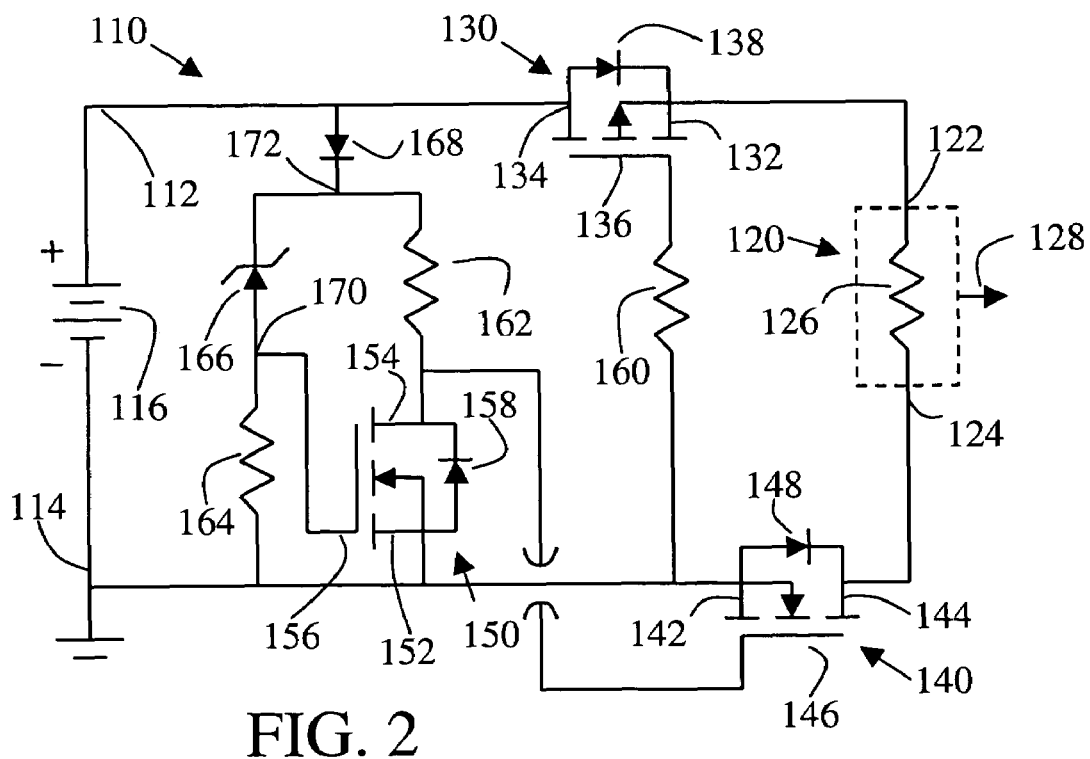
FIG. 2 is a circuit diagram of a second embodiment of the invention.

A second embodiment of the invention is circuit 110 shown in FIG. 2. This embodiment is similar to that of circuit 100 shown in FIG. 1 but uses an opposite polarity switching MOSFET 150. Elements of circuit 110 are numbered with reference numbers in the one hundred range ending in the same number as that of corresponding elements of circuit 10. For example, DC power supply 116 and sensor 120 are identical to battery 16 and sensor 20, respectively, of FIG. 1. Circuit 110 includes a p-channel MOSFET 130 with a source 132 and drain 134 connected in series between power terminal 112 and terminal 122 of sensor 120, a gate 136 and an internal bypass diode 138 essentially the same as MOSFET 30 of FIG. 1; but in the embodiment of FIG. 2, the source-drain orientation is reversed, with source 132 of MOSFET 30 (and thus the cathode of the diode in this p-channel MOSFET) connected to terminal 122 of sensor 120 and drain 134 connected to power terminal 116 so that internal bypass diode 138 opposes reverse current flow through load impedance 126 when the voltage provided by DC power supply 116 is reversed. Circuit 110 also includes an n-channel MOSFET 140 with a source 142 and drain 144 connected in series between terminal 124 of sensor 120 and power terminal 114, as well as a gate 146 coupled to power terminal 112 through a resistor 162 and an optional blocking diode 168. But the source-drain orientation of MOSFET 140 is also reversed, with source 142 connected to power terminal 114, with consequent reversal of the direction of internal bypass diode 148.

With reverse supply voltage polarity, MOSFET 130 will be turned off by a reversed (positive) gate-source voltage; and the current from power terminal 112 to sensor 120 through drain 134 and source 132 stops. Since its internal bypass diode 138 is oriented to block current flow in the opposite direction (from sensor 120 to power terminal 112), no current will flow through MOSFET 130, or through sensor 120, in either direction. Thus, the circuit blocks conduction through load impedance 126 if the battery is reversed.

Circuit 110 also optionally provides over-voltage protection, through a voltage sensing circuit and a switch comprising a third MOSFET 150, in this embodiment an n-channel MOSFET, that has a source 152 connected to source 142 of MOSFET 140 and a drain 156 connected to gate 46 of MOSFET 140. The voltage sensing element is a zener diode 166. Zener diode 166 is connected in a voltage divider from power terminal 112 to power terminal 114 comprising optional blocking diode 168, zener diode 166 and a resistor 164. The cathode of diode 168, connected to the cathode of zener diode 166 in a junction 172, is also connected through resistor 162 to drain 154 of MOSFET 150. Gate 156 of MOSFET 150 is connected to the junction of zener diode 166 and resistor 164 in a junction 170.

In the circuit of FIG. 2, the voltage needed to render MOSFET 150 conducting is two volts across resistor 164 to provide gate-source bias to MOSFET 140 plus the zener breakdown voltage of zener diode 166 plus the forward diode drop of diode 168 (if present). The zener breakdown voltage of zener diode 166 is thus selected so that this voltage sum equals the maximum desired positive voltage on power terminal 112. As long as the voltage on power terminal 112 is below this maximum desired voltage, MOSFET 150 will remain non-conducting; but if the voltage on power terminal 112 exceeds this maximum desired voltage, zener diode 166 will conduct and MOSFET 150 will be rendered conductive to render MOSFET 140 non-conductive.

As with blocking diode 68 in circuit 10 of FIG. 1, blocking diode 168 is optionally provided to prevent undesired current flows through the over-voltage protection portion of circuit 110 with a reverse polarity battery connection. Without diode 168, current from a reverse supply voltage polarity may flow through resistor 164 and zener diode 164 and also in parallel through MOSFET 150 and resistor 162. Diode 68 blocks both paths but is not necessary if resistors 162 and 164 are both sufficiently large or if the over-voltage protection portion of circuit is not present.

Each of the embodiments of FIG. 1 and FIG. 2 provides protection for a ratiometric output sensor that is minimally intrusive on the power supply and sensor during normal operation to preserve the ratiometric sensor output but responds to DC supply voltages in excess of a predetermined value or a reversed voltage supply to block the supply current.

The invention claimed is:

1. An input power protected ratiometric output sensor circuit comprising:

first and second power terminals;

a ratiometric output sensor having a load impedance between a pair of sensor input terminals and an output terminal providing an output voltage ratiometric with an input voltage applied across the load impedance;

a p-channel MOSFET having a source and a drain connected in series between the first power terminal and one of the pair of sensor input terminals of the ratiometric output sensor and further having a gate coupled to the second power terminal;

an n-channel MOSFET having a source and a drain connected in series between the second power terminal and the other of the pair of sensor input terminals of the ratiometric output sensor and further having a gate coupled to the first power terminal, whereby connection of a DC voltage power supply across the first and second power terminals with a predetermined positive polarity of the first power terminal relative to the second power terminal renders both the p-channel MOSFET and the n-channel MOSFET conducting to power the ratiometric output sensor but connection of a DC voltage power supply with a polarity reversed relative to the predetermined polarity across the first and second power terminals renders one of the p-channel MOSFET and the n-channel MOSFET non-conducting, the one of the p-channel MOSFET and the n-channel MOSFET having its source and drain oriented with respect to the load impedance so that any internal source-drain bypass diode therein is not effective to conduct bypass current flow with connection of a DC voltage power supply with a polarity reversed relative to the predetermined polarity across the first and second power terminals;

a third MOSFET having a source and a drain connected between the gate and source of the other of the p-channel MOSFET and the n-channel MOSFET and further having a gate; and a voltage sensing circuit having an output connected to the gate of the third MOSFET and being responsive to the voltage across the first and second power terminals to render the third MOSFET non-conducting and thus render the other of the p-channel MOSFET and the n-channel MOSFET conducting when the voltage across the first and second power terminals in the predetermined polarity is not greater than a predetermined value and alternatively to render the third MOSFET conducting and thus render the other of the p-channel MOSFET and the n-channel MOSFET non-conducting when the voltage across the first and second terminals in the predetermined polarity is greater than the predetermined value.

2. The input power protected ratiometric output sensor circuit of claim 1 wherein the other of the p-channel MOSFET and the n-channel MOSFET rendered non-conducting is the p-channel MOSFET and the third MOSFET is a p-channel MOSFET.

3. The input power protected ratiometric output sensor circuit of claim 1 wherein the other of the p-channel MOSFET and the n-channel MOSFET rendered non-conducting is the n-channel MOSFET 140 and the third MOSFET is an n-channel MOSFET.

4. The input power protected ratiometric output sensor circuit of claim 1 wherein the voltage sensing circuit is a voltage divider connected between the first and second power terminals, the voltage divider comprising a zener diode connected in series with a resistor at a junction, the junction comprising the output of the voltage sensing circuit.

5. The input power protected ratiometric output sensor circuit of claim 4 wherein the other of the p-channel MOSFET and the n-channel MOSFET rendered non-conducting is the p-channel MOSFET, the third MOSFET is a p-channel MOSFET with a source coupled to the first power terminal and the resistor is connected across the source and gate of the third MOSFET.

6. The input power protected ratiometric output sensor circuit of claim 4 wherein the other of the p-channel MOSFET and the n-channel MOSFET rendered non-conducting is the n-channel MOSFET, the third MOSFET is an n-channel MOSFET having a source coupled to the second power terminal and the resistor is connected across the source and gate of the third MOSFET.

7. The input power protected ratiometric output sensor circuit of claim 4 wherein the first power terminal is connected through a blocking diode to the cathode of the zener diode to prevent reverse current flow through the voltage sensing circuit when a DC voltage power supply is connected with a polarity reversed relative to the predetermined polarity across the first and second power terminals.

\* \* \* \* \*